United States Patent
Collins et al.

(10) Patent No.: US 11,721,367 B2
(45) Date of Patent: *Aug. 8, 2023

(54) SYNCHRONIZING MULTIPLE IMAGES OR VIDEOS TO AN AUDIO TRACK

(71) Applicant: Snap Inc., Santa Monica, CA (US)

(72) Inventors: Alexander Collins, Santa Monica, CA (US); Alexander Vodovoz, Inglewood, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/546,726

(22) Filed: Dec. 9, 2021

(65) Prior Publication Data
US 2022/0319552 A1    Oct. 6, 2022

Related U.S. Application Data

(63) Continuation of application No. 17/307,458, filed on May 4, 2021, now Pat. No. 11,227,637.
(Continued)

(51) Int. Cl.
*G11B 27/036* (2006.01)
*G11B 27/034* (2006.01)
(Continued)

(52) U.S. Cl.
CPC .......... *G11B 27/036* (2013.01); *G11B 27/034* (2013.01); *G11B 27/34* (2013.01);
(Continued)

(58) Field of Classification Search
CPC ..... G11B 27/036; G11B 27/034; G11B 27/34; H04N 5/783; H04N 21/8455; H04N 21/8547; H04N 21/8549
See application file for complete search history.

(56) References Cited

U.S. PATENT DOCUMENTS 6,871,006 B1    3/2005  Oguz et al.
7,362,946 B1    4/2008  Kowald
(Continued)

FOREIGN PATENT DOCUMENTS

EP    1587111    10/2005

OTHER PUBLICATIONS

U.S. Appl. No. 17/307,458, filed May 4, 2021, Synchronizing Multiple Images or Videos to an Audio Track.
(Continued)

*Primary Examiner* — Thai Q Tran
*Assistant Examiner* — Jose M Mesa
(74) *Attorney, Agent, or Firm* — Schwegman Lundberg & Woessner, P.A.

(57) ABSTRACT

A method for generation of a video montage file from a plurality of media files is disclosed. The method includes selecting media files from a collection of media files based on a selection criterion, accessing audio feature information for an audio track, the audio feature information including timing information related to audio features of the audio track, generating a first video segment for a first time slot from a first media file, generating a second video segment for a second time slot from a second media file, creating a video montage file by adding the second video segment to the first video segment, and adding the audio track to the video montage file. The selection criterion may comprise a location, a time interval, or presences of the media files in a feed posted by the user on a messaging system or social media platform.

20 Claims, 7 Drawing Sheets

Related U.S. Application Data

(60) Provisional application No. 63/168,500, filed on Mar. 31, 2021.

(51) Int. Cl.
   *G11B 27/34* (2006.01)
   *H04N 5/783* (2006.01)
   *H04N 21/8549* (2011.01)
   *H04N 21/8547* (2011.01)
   *H04N 21/845* (2011.01)

(52) U.S. Cl.
   CPC ......... *H04N 5/783* (2013.01); *H04N 21/8455* (2013.01); *H04N 21/8547* (2013.01); *H04N 21/8549* (2013.01)

(56) References Cited

U.S. PATENT DOCUMENTS

| | | | |
|---|---|---|---|
| 9,838,730 B1 | 12/2017 | Matias | |
| 10,178,365 B1 * | 1/2019 | Singh | G10H 1/40 |
| 11,227,637 B1 | 1/2022 | Collins et al. | |
| 2003/0160944 A1 | 8/2003 | Foote et al. | |
| 2008/0016114 A1 | 1/2008 | Beauregard et al. | |
| 2008/0092168 A1 | 4/2008 | Logan et al. | |
| 2010/0183280 A1 | 7/2010 | Beauregard et al. | |
| 2013/0077937 A1 | 3/2013 | Kennedy et al. | |
| 2015/0160916 A1 | 6/2015 | Lothian | |
| 2015/0279427 A1 * | 10/2015 | Godfrey | G10L 25/48 386/241 |
| 2019/0392866 A1 | 12/2019 | Yoon et al. | |
| 2020/0366395 A1 | 11/2020 | Brenner et al. | |
| 2021/0144422 A1 * | 5/2021 | Wagner | H04N 21/4131 |

OTHER PUBLICATIONS

"U.S. Appl. No. 17/307,458, Notice of Allowance dated Sep. 14, 2021", 12 pgs.

"International Application Serial No. PCT/US2022/021345, International Search Report dated Jul. 21, 2022", 4 pgs.

"International Application Serial No. PCT/US2022/021345, Written Opinion dated Jul. 21, 2022", 6 pgs.

* cited by examiner

SYNCHRONIZING MULTIPLE IMAGES OR VIDEOS TO AN AUDIO TRACK

CLAIM OF PRIORITY

This application is a continuation of U.S. patent application Ser. No. 17/307,458, filed on May 4, 2021 and also claims the benefit of priority to U.S. Provisional Application Ser. No. 63/168,500, filed on Mar. 31, 2021, both of which are incorporated herein by reference in their entireties.

BACKGROUND

Social networking applications provide a vehicle for the sharing of user content such as photos or videos. In some instances, the photos or videos may be supplemented by augmented reality or other effects that are generated live on a camera feed and displayed on the display of a mobile device for preview. The user may be able to select and manipulate effects to apply to the live camera feed, and when satisfied capture an image or record a video including the effects. The captured video or photo can then be shared on the social networking platform.

Photos can easily be edited after capture, but it may be desirable to provide additional options for enhancing, editing or presenting captured or stored videos and photos.

BRIEF DESCRIPTION OF THE DRAWINGS

In the drawings, which are not necessarily drawn to scale, Like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
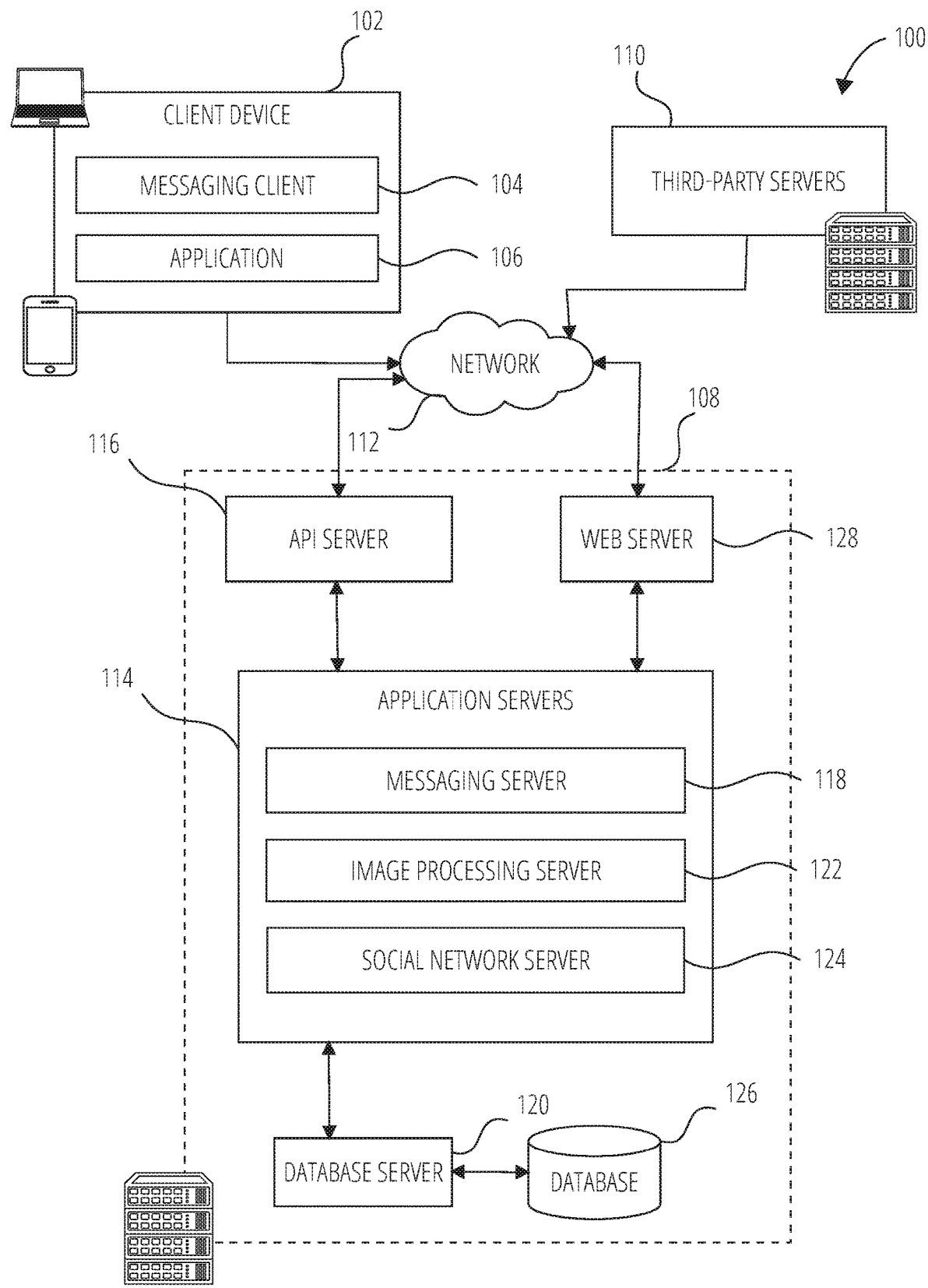
FIG. 1 is a diagrammatic representation of a networked environment in which the present disclosure may be deployed, in accordance with some examples.

Users of messaging and social media platforms typically want to share their experiences with other users, including friends or followers. As the sheer amount of photos and videos captured by users of smartphones has increased, it may become time consuming for a user to select and assemble a collection of media to be shared, Additionally, the providers of such platforms also want to encourage engagement by the users with their platforms and associated applications by providing new or enhanced features and capabilities. Furthermore, the creation of content from different media types, such as video, images and audio, may be beyond the capabilities or interest of some users.

Disclosed herein are examples of the creation of shareable content in the form of a video montage with an audio track. The video montage comprises short video segments that have either been obtained from longer videos captured or stored by the user or that are generated from images captured or stored by the user. Each video segment is assigned to one or more time slots that are based on features (e.g. the beats) of the audio track so that transitions between video segments coincide with the features of the audio track. In one example, the transitions are synchronized to the beats of the audio track. The video montage is created by assembling the video segments together and adding the audio track to the video montage such that a starting feature (e.g. a starting beat) of the audio track coincides with the first video segment.

In one aspect, a method executed by one or more processors for generation of a video file from a plurality of media files includes accessing feature information (e.g. beat information) for an audio track having features (e.g. beats), the feature information including a starting feature location and subsequent time slot information related to the features of the audio track, generating a first video segment for a first time slot from a first media file, generating a second video segment for a second time slot from a second media file, creating a video montage file by adding the second video segment to the first video segment, and adding the audio track to the video montage file with the starting feature location in the audio track coinciding with a start of the first video segment.

The first media file may be a first video file and the method may further include extracting a portion of the first video file to generate the first video segment. The method may also include adjusting a playback speed of the portion of the first video file to generate the first video segment, the playback speed being based on a length of the first video file. Alternatively, the first media file may be an image and the first video segment may be generated by converting the first media file to a video segment having a length corresponding to the first time slot.

The method may further include determining a first initial cut point for a particular video segment to be generated from a particular video media file, determining a closest i-frame in the particular video media file to the first initial cut point, setting a first actual cut point to a location of the closest i-frame, and creating the particular video segment by trimming the particular video media file at the first actual cut point.

The method may further include determining a second actual cut point from the first actual cut point and a length of an associated time slot, and creating the particular video segment by trimming the particular video media file at the second actual cut point.

The method may further include determining a second preliminary cut point from the first actual cut point and a length of an associated time slot, based on a cumulative time offset in the video montage file being greater than zero, setting a second actual cut point to be before the second preliminary cut point, based on a cumulative time offset in the video montage file being less than zero, setting a second actual cut point to be after the second preliminary cut point, and creating the particular video segment by trimming the particular video media file at the second actual cut point. Other technical features may be readily apparent to one skilled in the art from the following figures, descriptions, and claims.

In another aspect, a computing apparatus includes a processor and a memory storing instructions that, when executed by the processor, configure the apparatus to perform operations to generate a video file from a plurality of media files for presentation on a display, the operations includes accessing feature information (e.g. beat information) for an audio track having features (e.g. beats), the feature information including a starting feature location and subsequent time slot information related to the features of the audio track, generating a first video segment for a first time slot from a first media file, generating a second video segment for a second time slot from a second media file, creating a video montage file by adding the second video segment to the first video segment, and adding the audio track to the video montage file with the starting feature location in the audio track coinciding with a start of the first video segment.

The first media file may be a first video file and the instructions may further configure the apparatus to perform operations includes extracting a portion of the first video file to generate the first video segment, and adjusting a playback speed of the portion of the first video file to generate the first video segment, the playback speed being based on a length of the first video file.

The instructions may further configure the apparatus to perform operations including determining a first initial cut point for a particular video segment to be generated from a particular video media file, determining a closest i-frame in the particular video media file to the first initial cut point, setting a first actual cut point to a location of the closest i-frame, and creating the particular video segment by trimming the particular video media file at the first actual cut point. The instructions may further configure the apparatus to perform operations including determining a second actual cut point from the first actual cut point and a length of an associated time slot, and creating the particular video segment by trimming the particular video media file at the second actual cut point.

The instructions may further configure the apparatus to perform operations including determining a second preliminary cut point from the first actual cut point and a length of an associated time slot, based on a cumulative time offset in the video montage file being greater than zero, setting a second actual cut point to be before the second preliminary cut point, based on a cumulative time offset in the video montage file being less than zero, setting a second actual cut point to be after the second preliminary cut point, and creating the particular video segment by trimming the particular video media file at the second actual cut point.

In another aspect, provided is a non-transitory computer-readable storage medium, the computer-readable storage medium including instructions that when executed by a computer, cause the computer to generate a video file from a plurality of media files, by accessing feature information (e.g. beat information) for an audio track having features (e.g. beats), the feature information including a starting feature location and subsequent time slot information related to features of the audio track, generating a first video segment for a first time slot from a first media file, generating a second video segment for a second time slot from a second media file, creating a video montage file by adding the second video segment to the first video segment, and adding the audio track to the video montage file with the starting feature location in the audio track coinciding with a start of the first video segment.

The first media file may be a first video file and the computer-readable storage medium may include instructions further configuring the computer to perform operations including extracting a portion of the first video file to generate the first video segment, and adjusting a playback speed of the portion of the first video file to generate the first video segment, the playback speed being based on a length of the first video file. The first media file may alternatively be an image, and the instructions may further configure the computer to perform operations including generating the first video segment by converting the first media file to a video segment having a length corresponding to the first time slot.

The computer-readable storage medium may also include instructions to further configure the computer to perform operations including determining a first initial cut point for a particular video segment to be generated from a particular video media file, determining a closest i-frame in the particular video media file to the first initial cut point, setting a first actual cut point to a location of the closest i-frame, and creating the particular video segment by trimming the particular video media file at the first actual cut point.

The computer-readable storage medium may also include instructions to further configure the computer to perform operations including determining a second actual cut point from the first actual cut point and a length of an associated time slot, and creating the particular video segment by trimming the particular video media file at the second actual cut point.

The computer-readable storage medium may alternatively include instructions to further configure the computer to perform operations including determining a second preliminary cut point from the first actual cut point and a length of an associated time slot, and based on a cumulative time offset in the video montage file being greater than zero, setting a second actual cut point to be before the second preliminary cut point. Based on a cumulative time offset in the video montage file being less than zero, a second actual cut point may be set to be after the second preliminary cut point. The perform operations may also include creating the particular video segment by trimming the particular video media file at the second actual cut point.

Other technical features may be readily apparent to one skilled in the art from the following figures, descriptions, and claims.

FIG. 1 is a block diagram showing an example messaging system 100 for exchanging data (e.g.; messages, media and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Application Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 OF the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. The text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

The social network server 124 supports various social networking functions and services and makes these functions and services available to the messaging server 118. To this end, the social network server 124 maintains and accesses an entity graph within the database 126. Examples of functions and services supported by the social network server 124 include the identification of other users of the messaging system 100 with which a particular user has relationships or is "following," and also the identification of other entities and interests of a particular user.

Figure 2:
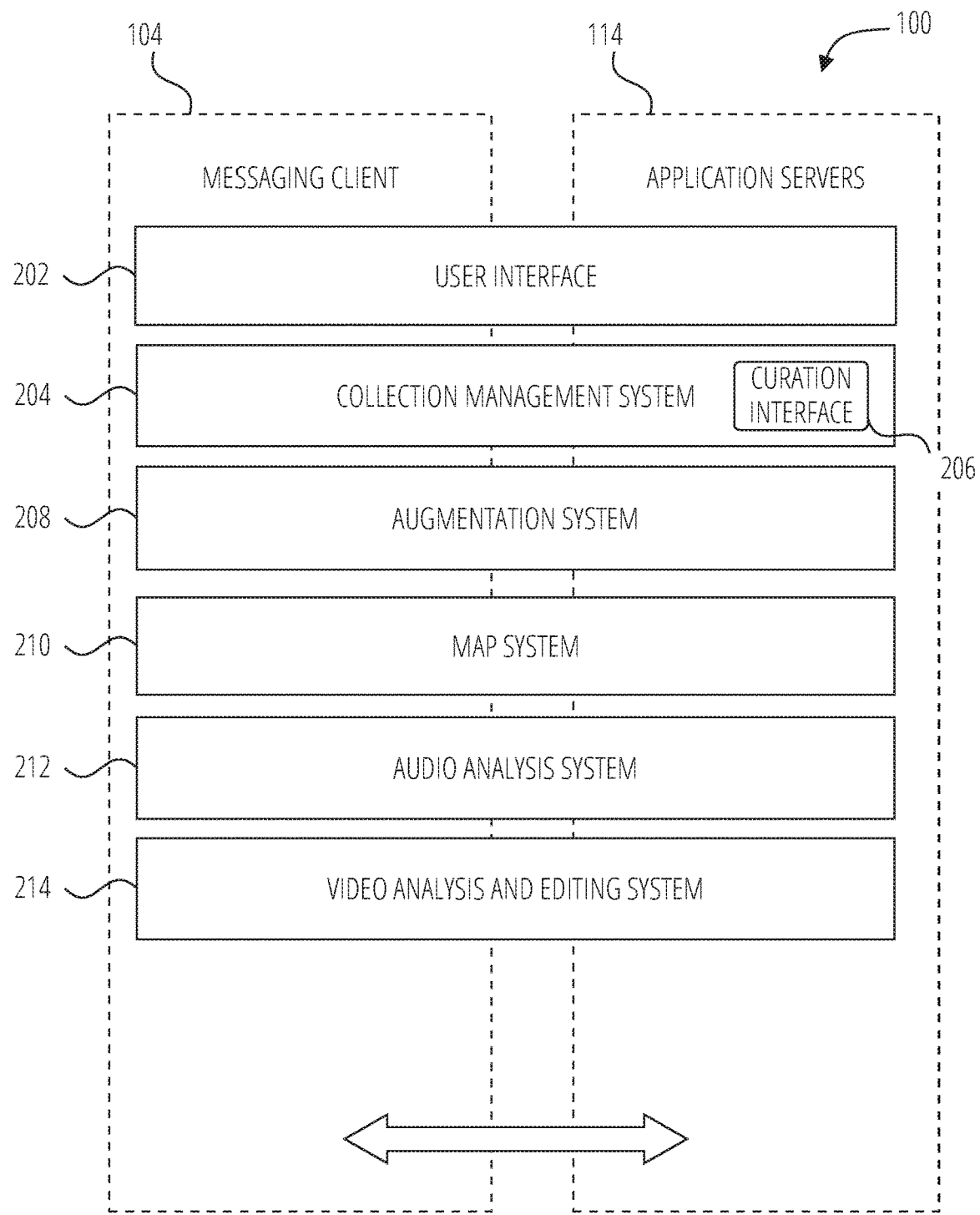
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever-side by the application servers 114. These subsystems include, for example, a user interface 202, a collection management system 204, an augmentation system 208, a map system 210, an audio analysis system 212, and a video analysis and editing system 214.

The user interface 202 is responsible for providing output to and receiving input from a user of the messaging client 104 on the client device 102. The user interface provides a user-manipulatable display output on a display (see further user output components 626 in FIG. 6 and as described below) of the client device 102 as is known in the art. In one example, the user interface comprises a chat interface whereby a user can send and receive messages and associated content from one or more remote users. The user interface 202 also permits a user to manipulate live or captured media, for example by providing augmented reality effects on captured photos or videos, or on a live feed from a camera of the user device.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). The media overlays may be stored in the database 126 and accessed through the database server 120.

The map system 210 provides various geographic location functions, and supports the presentation of map-based media content and messages by the messaging client 104. For example, the map system 210 enables the display of user icons or avatars on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The audio analysis system 212 provides analysis of audio tracks in certain cases described herein. In particular, the audio analysis system 212 uses transient detection to identify the timestamp of a starting beat for use in pairing a song with a collection of visual media as described herein, as well as determining the beats per minute of the audio track, which can then be used as described herein for automatically synchronizing the presentation of visual media with the beat of the audio track. The beats per minute of the audio track may for example be converted to a beat period (i.e. the time in seconds between each beat), which together with the timestamp of the starting beat, can be used to generate a beat grid that can be used to synchronize the presentation of visual media with the beat of the audio track. Alternatively, beats per minute, beat period or a beat grid may be included in metadata associated with the audio track.

The beat grid defines time slots into which a video or photo can be inserted. A time slot is defined in terms of a number of beat periods, which is typically but not necessarily an integer number of beat periods. In the simplest example, a beat grid could comprise a number of slots of identical sizes (e.g. 1 or 2 beats per slot) or the slot size could vary throughout the beat grid.

An example of a beat grid is as follows:

```
"beat_period": 0.588,
"soundtrack_seek_start_time": "5.883",
"soundtrack": "patent_rock.mp3",
"beats_per_slot": [
2.0,
1.0,
2.0
]
```

In this example, the beat period of the audio track "patent_rock.mp3" is 0.588 s, the starting beat is located at 5.883 seconds from the start of the audio track, the first slot is 2.0 beats, the second slot is 1.0 beats, and the third slot is 2.0 beats.

A slot identifies potential transition points in the generated video between one photo or video and the next photo or video. In some examples, the numbers of beats per slot for each slot in an audio track are selected by a human operator, while in other embodiments the audio track is analyzed by the audio analysis system 212 to determine slot sizes (or transition points from which slot sizes can be determined) based on chord or intensity changes (changes to the harmonic or spectral aspects of the audio) or based on major transients such as off-beat percussion (based on detecting transients from the audio content), in addition to or instead of the location of a beat. For example, a slot size may be increased so that the beat at the beginning of the next slot will coincide with the start of a vocal track or segment, or slot sizes may be adjusted so that the beginning or end of slots will coincide with repeated or characteristic words such as "Go!" or "Party!" or "Love" or "Kiss." The size of a slot can vary, but is typically intended to be enough time for a viewer of the video montage to receive a fair visual impression of the image or video segment but at the same time maintaining a dynamic overall presentation. In one example, each slot may be 0.5 to 1 seconds, and the number of beats per slot will vary accordingly based on the beat period.

While described herein in some examples with reference to a starting beat and beat parameters such as beat period and beats per slot, the audio system may generate a feature grid that includes a starting feature location and subsequent time slot information based on or related to any features of the audio track. Features may be any identifiable feature in an audio track, for example chord or intensity changes (changes to the harmonic or spectral aspects of the audio) or major transients such as off-beat percussion (based on detecting transients from the audio content), the start of a vocal track or segment, repeated or characteristic words such as "Go!" or "Party!" or "Love" or "Kiss," and so forth.

Additionally, a feature grid accompanying a song may have been or may be defined or modified by a human operator based on features chosen based on preferences or aesthetic or other considerations.

The video analysis and editing system 214 implements the methods described in more detail below. In particular, the video analysis and editing system 214 selects, retrieves and optionally modifies one or more videos or photos for inclusion in a video that is matched to an audio track using beat period or other feature information determined by the audio analysis system 212 or provided with an audio track.

The video analysis and editing system 214 may also initiate scanning of available photos and videos, either stored locally on the client device 102 or remotely in the messaging server system 108 or on a third-party server 110, to initiate the generation of a beat-matched video montage as described herein. The scanning may be initiated based on the detection of a certain number of new photos or videos that have been captured or stored by a user of the client device 102, or based on the user initiating the scanning of one or more videos in an existing collection. The scanning may also be provided based on intervals or dates (e.g. once a week, once a month etc.) or on location information, for example based on the client device 102 being or having been at a vacation destination. Additionally, scanning of videos may be initiated from the messaging server system 108 or the messaging client 104 based on events or promotions initiated by the host of the messaging service. The user may also choose particular photos and videos for inclusion in a video montage generated herein. Still further, the photos and videos may be taken from a timeline or "story" posted by the user on the messaging system 100 or social media platform. Finally, the creation of a new video may occur once the video analysis and editing system 214 determines that a sufficient amount of new media is available since the last time a video montage was created.

The video analysis and editing system 214 assigns and, in certain cases edits, videos and photos to slots based on a number of rules. For example, a photo may be assigned to one slot, but may also be assigned to two or more slots if the video analysis and editing system 214 determines that it includes a caption or the face of the user or someone having a close relationship with the user.

Additionally, the number of slots in the video montage to which a video is allocated and the speed at which a video will be played back in the video montage may depend on the duration of the video and on the content of the video. For example, a short video may be assigned to one slot at normal playback speed, while a medium length video may be assigned to two slots at 2× playback speed, while a long video may be assigned up to 4 slots at 4× playback speed.

Even with assigning more slots and higher playback speeds, a video may still be significantly longer than the allocated slots, in which case it is necessary to trim the video to fit into the allocated slots. For example, a 60 s video at a 4× playback speed will be 15 s long. If this video is assigned to four slots of one beat period length, with a beat period of 0.5 s, only 2 s of the 15 seconds is available. In such a case, the video will be trimmed by the video analysis and editing system 214 to a duration of 2 s at 4× playback speed. The video analysis and editing system 214 may select the portion of the video to be used in the video montage based on various criteria. In one example, the video analysis and editing system 214 takes the central 2 s of the 15 s video on the assumption that more relevant content is likely to be found in the middle of the video. In other examples, the selected portion of the video is based on the presence of faces or speech in the selected portion as determined by either facial recognition performed by the video analysis and editing system 214 or by voice recognition performed by the audio analysis system 212. Preference may also be given to close-up faces or faces that are recognized by the video analysis and editing system 214 as the user or as someone with which the user has a relationship.

One example, using the parameters from the patent_rock.mp3 audio track shown above, will now be described. In this example, three media items are to be included in the video montage, a video (Media_1) of 5.5 seconds duration, and two images, Media_2 and Media_3. The following steps are performed by the video analysis and editing system 214:

1. Determine total slot duration for slot 1:
   a. 2.0 beats at 0.588 beat period. Total slot duration is 1.176 seconds.
2. Determine Media_1 duration at 1×, 2×, 3×, and 4× speed.
   a. Media_1 at 1× speed is 5.5 seconds long.
   b. Media_1 at 2× speed is 2.75 seconds long.
   c. Media_1 at 3× speed is 1.833 seconds long.
   d. Media_1 at 4× speed is 1.375 seconds long.
3. Select the media duration that provides the highest speed with the duration being equal to or greater than the slot duration.
   a. Media_1 at 4× speed is 1.375 seconds which is greater than or equal to the 1.176 second slot duration.
4. Trim Media_1 equally at its beginning and end to match the slot duration. At 4× speed, 0.199 seconds total needs to be trimmed. At 1× speed this is 0.796 seconds that needs to be trimmed from Media_1, or two portions of 0.398 seconds at each end of Media_1.
   a. Trim end of media by 0.398, i.e. from time 5.102 to end time 5.5 seconds.
   b. Trim beginning of media by 0.398, i.e. trim from start time 0 to 0.398 seconds.
   c. New media duration is 4.704 seconds long.
   d. Speed up media by 4× giving a new duration of 1.176 seconds, or 4.704/4.
5. Add transformed Media 1 to slot 1.
6. Calculate total slot duration for slot 2:
   a. 1.0 beats at 0.588 beat period. Total slot duration is 0.588 seconds.
7. Convert Media_2 to a video with a total play time of 0.588 seconds.
8. Add transformed Media_2 to slot 2.
9. Calculate total slot duration for slot 3;
   a. 2.0 beats at 0.588 beat period. Total slot duration is 1.176 seconds.
10, Convert Media_3 to a video with a total play time of 1.176 seconds.
11. Add transformed Media_3 to slot 3.
12. Combine transformed medias from slots 1, 2, 3 to form video montage.
    a. Video montage is 2.94 seconds long consisting of a sped up video that plays for 1.176 seconds, then a static video that plays for 0.588 seconds, then a static video that plays for 1.176 seconds.
13. Overlay audio track onto video montage.
    a. Audio track start time is at 5.883 seconds, matching the "soundtrack seek start time" parameter for this example.
    b. Soundtrack end time is at 8.823 seconds. 5.883 seconds start time plus 2.94 second video montage duration).

Upon completion of creation of the video montage by the video analysis and editing system 214, a notification may be provided to a user by the user interface 202 of the messaging client 104. The notification will indicate that a new video montage is available, and prompt either viewing of the video montage or dismissal of the notification. Additionally, dismissal may provide the option of deleting the video montage. Alternatively, the video montage may automatically be deleted if the notification is dismissed. Upon viewing the video montage, user interface controls may be provided to permit saving, forwarding, posting and so forth, of the video montage.

Figure 3:
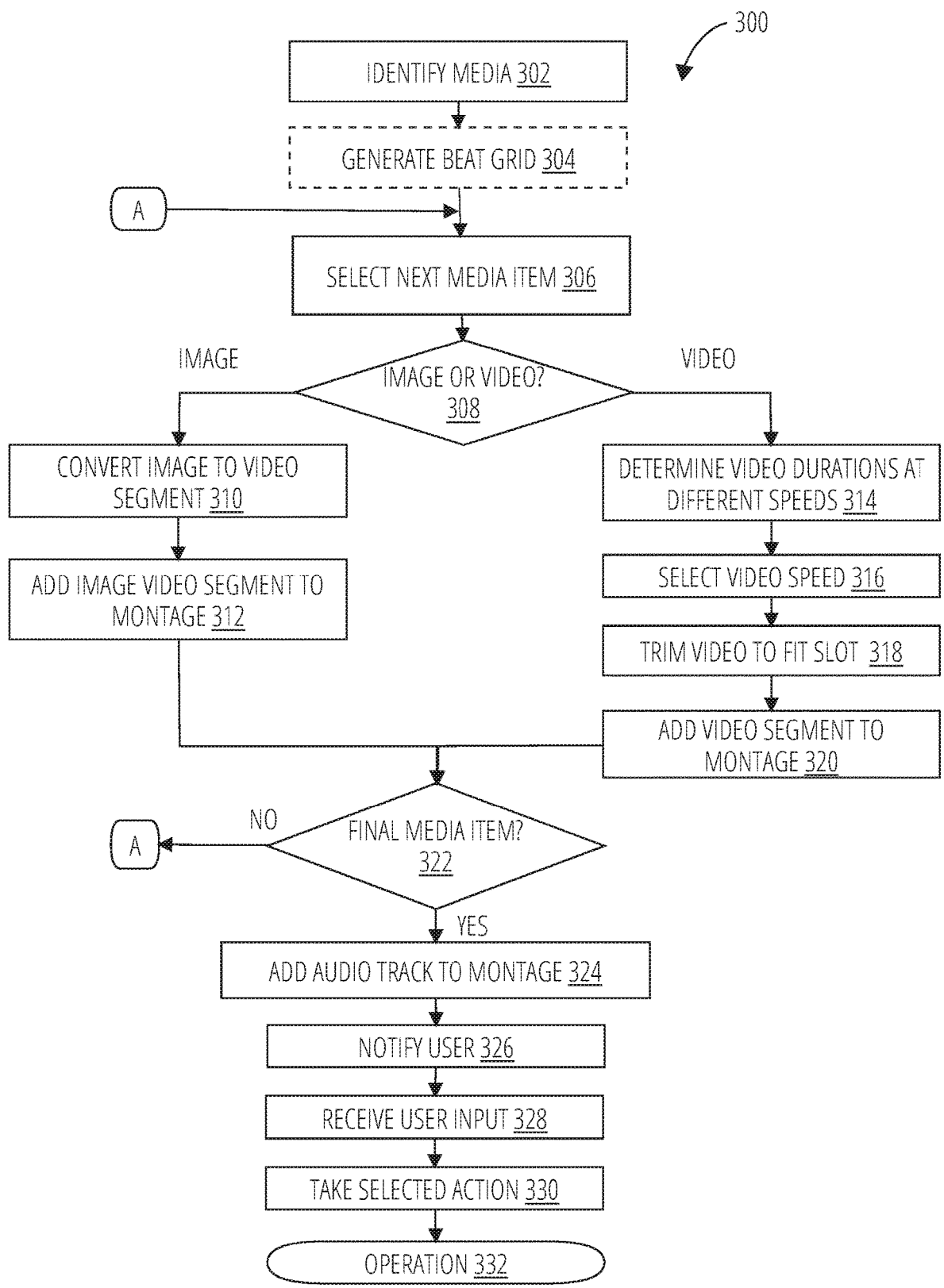
FIG. 3 is a flowchart showing video analysis and editing operations according to some examples.

FIG. 3 is a flowchart 300 showing video montage creation operations according to some examples. The operations illustrated in FIG. 3 will typically execute on client device 102 in an application such as messaging client 104, a video editing application, or a camera application provided with the messaging client 104. Various implementations are of course possible, with some of the operations taking place in application servers 114, or with one application calling another application or SDK for required functionality. In one example, the operations are performed jointly between the user interface 202 and video analysis and editing system 214 embodied in messaging client 104 running on client device 102. For the purposes of clarity, flowchart 300 is discussed herein with reference to such an example.

The method starts at operation 302 with media being identified by the messaging client 104 for inclusion in a video montage. As discussed above, the messaging client 104 may scan for photos and videos based on the detection of a certain number of new photos or videos that have been captured or stored by a user of the client device 102, or based on the user initiating the scanning of one or more videos in an existing collection. The user may also choose particular photos and videos for inclusion in a video montage generated herein, or they may be taken from a timeline or "story" posted by the user on the messaging system 100 or social media platform. The order in which the media is included in the video montage is chronologically based on the date of capture but other orders could be provided, for example by permitting a user to specify the order explicitly.

Additionally, an associate audio track is determined or selected in operation 302. The selection of the audio track can be done by the user, either a track of their choosing, or suggested or selected by the messaging system 100 based on newly-available tracks or newly-analyzed tracks having a feature grid (e.g. a beat grid) included therewith as metadata. Additionally, contextual information may be used to select the audio track, for example based on the user's preferences or information from their profile or timeline (e.g. favorite band, recent concert attended, and so forth).

If the audio track does not have an accompanying feature grid, the feature grid is then generated for the audio track at operation 304. This is done by the audio analysis system 212 as discussed above, and in one example the feature grid is a beat grid.

The first (i.e. "next") media item is then selected at operation 308 and is associated with the first (next) slot length in the feature grid.

The video analysis and editing system 214 then determines whether the media item is an image or a video at operation 308. If the media item is an image the method proceeds at operation 310 where the image is converted to a video of the appropriate length. As discussed above, in one example an image is converted to a video segment of one slot length unless it includes content that may be of greater interest, such as a caption or the face of the user or someone having a close relationship with the user, in which case it is converted to a video segment of more than one slot length, such as two slot lengths. In such an example the video analysis and editing system 214 will have performed facial or text recognition on the image as part of operation 308.

The image video segment is then added to the video montage at operation 312. The method then continues at operation 322 where the video analysis and editing system 214 determines whether or not the most recent media item is the final media item. If not, the method returns to operation 306 for processing of the next media item. If so, the method continues at operation 324.

If the video analysis and editing system 214 determines at operation 308 that the media item is a video, the method continues at operation 314. The video duration at various playback speeds is determined in operation 314 as discussed previously. The video playback speed is then selected at operation 316 to be the highest speed with the video duration being equal or greater than the associated slot duration. The video is then trimmed by the video analysis and editing system 214 at operation 318 to create a video segment that is as long, at the selected playback speed, as its associated slot length. As discussed above, this can be done by trimming the video equally at each end or by determining the location of potentially relevant content in the video. Furthermore, the exact location of cut points may be determined as discussed below with reference to FIG. 4A and FIG. 4B.

The video analysis and editing system 214 then adds the video segment to the video montage at operation 320. The method then continues at operation 322 where the video analysis and editing system 214 determines whether or not the most recent media item is the final media item. If not, the method returns to operation 306 for processing of the next media item. If so, the method continues at operation 324.

At operation 324 the video analysis and editing system 214 adds the selected audio track to the video montage, starting at the start time in the audio track identified in the feature grid. The added portion of the audio track will have the same duration as the video montage. The completed video montage is then stored locally on client device 102 or remotely on the messaging server system 108 or one of the third-party servers 110.

The messaging client 104 then notifies the user of completion of the video montage in operation 326, for example by providing a pop-up window or other notification on the display of the client device 102 via the user interface 202. The notification may be in the form of a prompt stating that the video montage is available and asking if the user would like to view it, save it, discard it or provide a reminder at a later time. The notification may also be dismissed.

A selection by the user is then received by the messaging client 104 at operation 328 and the selected action is performed by messaging client 104 at operation 330. As discussed above, the selected action may be to view the edited video, save it, discard it or provide a reminder at a later time. Appropriate steps are performed and appropriate contexts are provided depending on the selected action, example, if the user chooses to view the video, the video is displayed by the messaging client 104 on the client device 102 and conventional messaging client 104 user-selectable options are provided. For example, options may be provided to send the video in a message or chat session, post the video to a social network feed, save the video to the "camera roll" folder on the client device 102, or edit the video. In the event that the user chooses to dismiss the notification, the edited video may be deleted.

Upon completion of the selected action in operation 330, the flowchart 300 ends at operation 332. At this point the messaging client may return to a default user interface.

Conventional video encoding includes spaced-apart keyframes or intraframes (i-frames), which are full frames of the image in the video. Subsequent frames, the delta frames (b-frames or p-frames), only contain the information that has changed from a previous frame. If a video is cut is on a delta frame, it is necessary to re-encode the video to generate an i-frame for use at the start of the video segment, otherwise an incomplete frame with artifacts may be found at the start of that video segment. Re-encoding the trimmed video to place a new i-frame at the start of the video segment has an associated cost, since it is more computationally intensive. This may affect the time taken to generate the video montage and will place additional demands on the client device 102 and its resources. For example, using current encoding software, cutting a 4.5 second segment from a longer video and generating an i-frame at the cut point takes 1.284 seconds. Creating a video montage with many video segments can thus take more time and use more computing resources than may be desirable for client device 102 or for a user of the client device 102.

In one example, the video analysis and editing system 214 identifies the two adjacent i-frames to a desired first cut point, selects the closest of the two adjacent i-frames as the first cut point, and adjusts the second cut point accordingly. For example, for the Media_1 example above, with original cut times of 0.398 seconds and 5.102 seconds, if there was an i-frame at 0.3 seconds and another i-frame at 1.5 seconds, the video analysis and editing system 214 would subtract the i-frame times from the desired start time, compare the magnitudes of the resulting values, determine that the i-frame at 0.3 seconds is closer to the original start time of 0.398 seconds than the i-frame at 1.5 seconds, and then cut the video at 0.3 seconds and 5.004 seconds to generate the required 4.704 second video segment. Using current encoding software, cutting a 4.5 second segment at an i-frame only requires 0.002 seconds, a 64200% processing time improvement over creating a new i-frame for use at a 0.398 second cut point.

In some instances, available cut point locations may not match the beats per slot duration or the duration between features in a feature grid. For example, if a desired video segment length is 4.5 seconds the first available second cut point that includes the full video segment may be at 4.58 seconds. The 80 ms additional duration may be perceptually unnoticeable to a viewer of the video segment, but when compounded across many video segments, the video montage may become noticeably off-beat compared to the audio track.

Figure 4A:
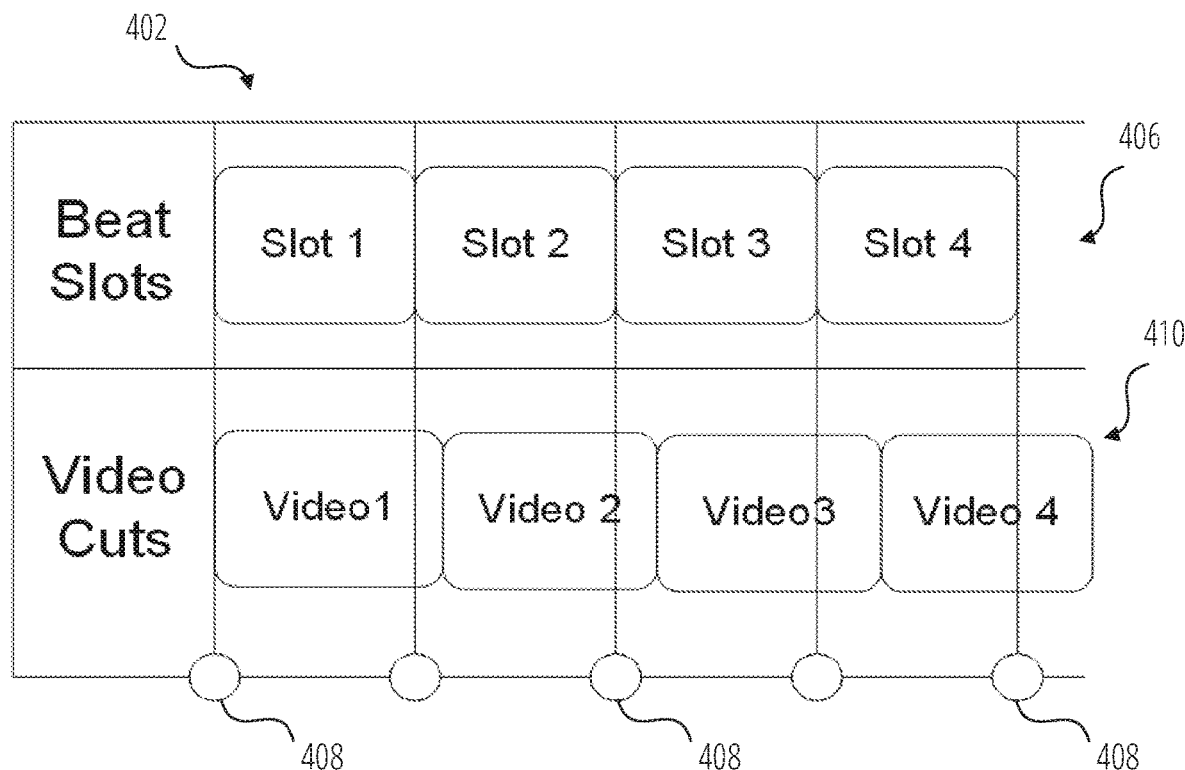
FIG. 4A is a chart showing an accumulating time difference between video cuts and beat slots according to some examples.

FIG. 4A is a chart 402 showing an accumulating time difference between video cuts 410 and beat slots 406 based on a 4.5 second requested cut duration at normal playback speed. As can be seen from the figure, video cuts 410 become progressively offset from beats 408 (or features in a feature grid). As illustrated in the following table, this can for example occur when a desired video segment length is 4.5 seconds and first available second cut point that includes the full video segment is at 4.58 seconds.

| Slot 1<br>Video 1 | Slot 2<br>Video 2 | Slot 3<br>Video 3 | Slot 4<br>Video 4 |
| --- | --- | --- | --- |
| Requested cut duration: 4.5 s<br>Received cut duration: 4.58 s<br>Cumulative offset:<br>0.08 s | Requested cut duration: 4.5 s<br>Received cut duration: 4.58 s<br>Cumulative offset:<br>0.16 s | Requested cut duration: 4.5 s<br>Received cut duration: 4.58 s<br>Cumulative offset:<br>0.24 s | Requested cut duration: 4.5 s<br>Received cut duration: 4.58 s<br>Cumulative offset:<br>0.32 s |

To address this problem in one example, the requested cut duration is adjusted by the amount of the cumulative offset, and the cut duration is then set to the next available cut duration.

Figure 4B:
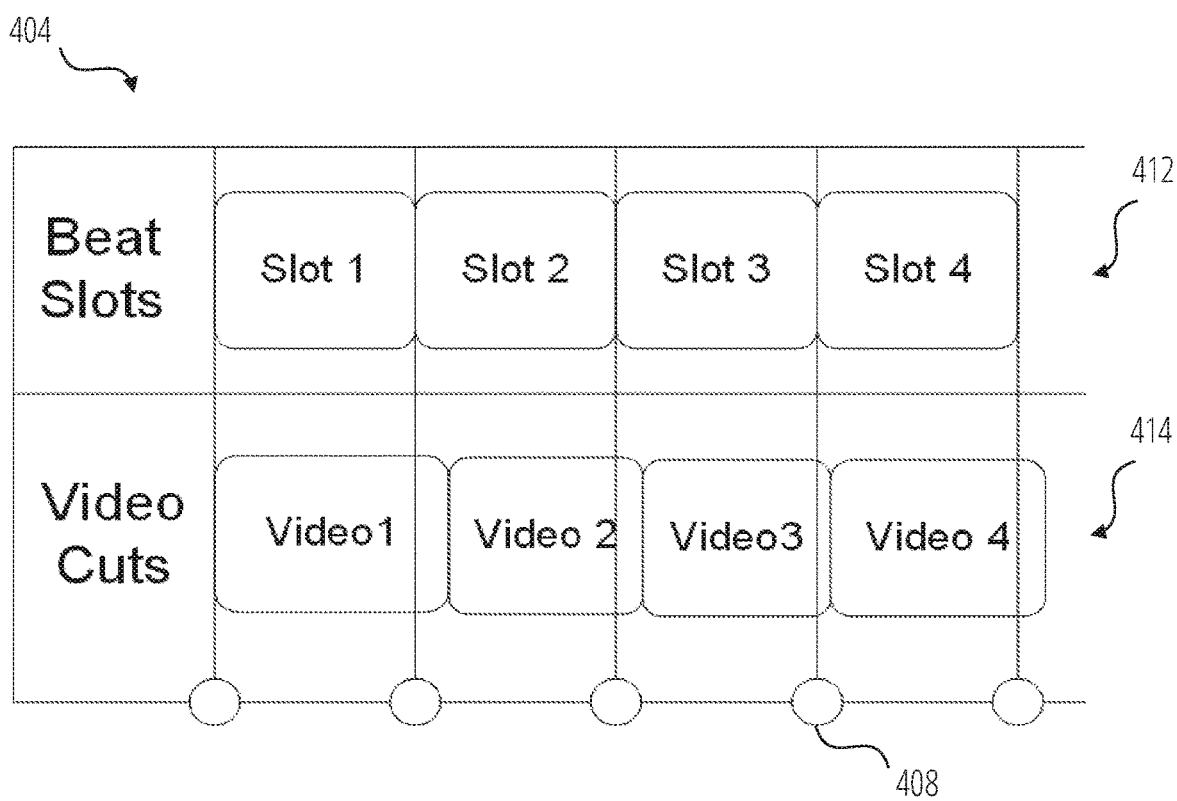
FIG. 4B is a chart showing an adjustment to prevent or reduce an accumulating tune difference between video cuts and beat slots according to some examples.

FIG. 4B is a chart 404 showing an adjustment to prevent or reduce an accumulating time difference between video cuts 414 and feature or beat slots 412. As illustrated in the following table, the cumulative offset is subtracted from the requested cut duration to create an updated cut duration that will tend to reduce the magnitude of the cumulative offset by the end of the next slot, and will in any event prevent the cumulative offset from becoming noticeable to a user.

| Slot 1<br>Video 1 | Slot 2<br>Video 2 | Slot 3<br>Video 3 | Slot 4<br>Video 4 |
| --- | --- | --- | --- |
| Requested cut duration: 4.5 s<br>Received cut duration: 4.58 s<br>Cumulative offset:<br>0.08 s | Requested cut duration: 4.42 s<br>Received cut duration: 4.47 s<br>Cumulative offset:<br>0.05 s | Requested cut duration: 4.45 s<br>Received cut duration: 4.47 s<br>Cumulative offset:<br>0.02 s | Requested cut duration: 4.48 s<br>Received cut duration: 4.58 s<br>Cumulative offset:<br>0.1s |

In an alternative example, the closest available cut duration that will tend to reduce the magnitude of the cumulative offset will be selected. So for example, with the two closest available cut durations to 4.5 seconds being 4.47 seconds and 4.58 seconds as shown in the table above, this would result in the same received cut duration for Slots 1 to 3, but for Slot 4 a 4.47 cut duration would be selected, which would result in a cumulative offset of −0.02 seconds. Slot 5 would then have a received cut duration of 4.58 seconds and a cumulative offset of 0.06 seconds.

In a further alternative example, if the cumulative offset is greater than zero then the earlier closest cut duration is selected and if the cumulative offset is less than zero then the later closest cut duration is selected. If the cumulative offset is equal to zero then the later closest cut duration is selected.

In yet a further alternative example, the length of a video segment generated from an image is selected to be its associated slot length minus the cumulative offset.

The cumulative offset will of course depend on the playback speed of the video segment. For example, if Video 1 above is edited to create a 1.145 second (received cut duration divided by four) clip at a perceived 4× playback speed, the offset will be 0.02 s. In such an example, the cumulative offset is based on the offsets for each edited clip as they will be inserted into the video montage based on their playback speeds.

While described with reference to beat slots, the methods of FIG. 4A and FIG. 4B apply equally to slot lengths or requested cut durations in a feature grid based on or including other features.

Figure 5:
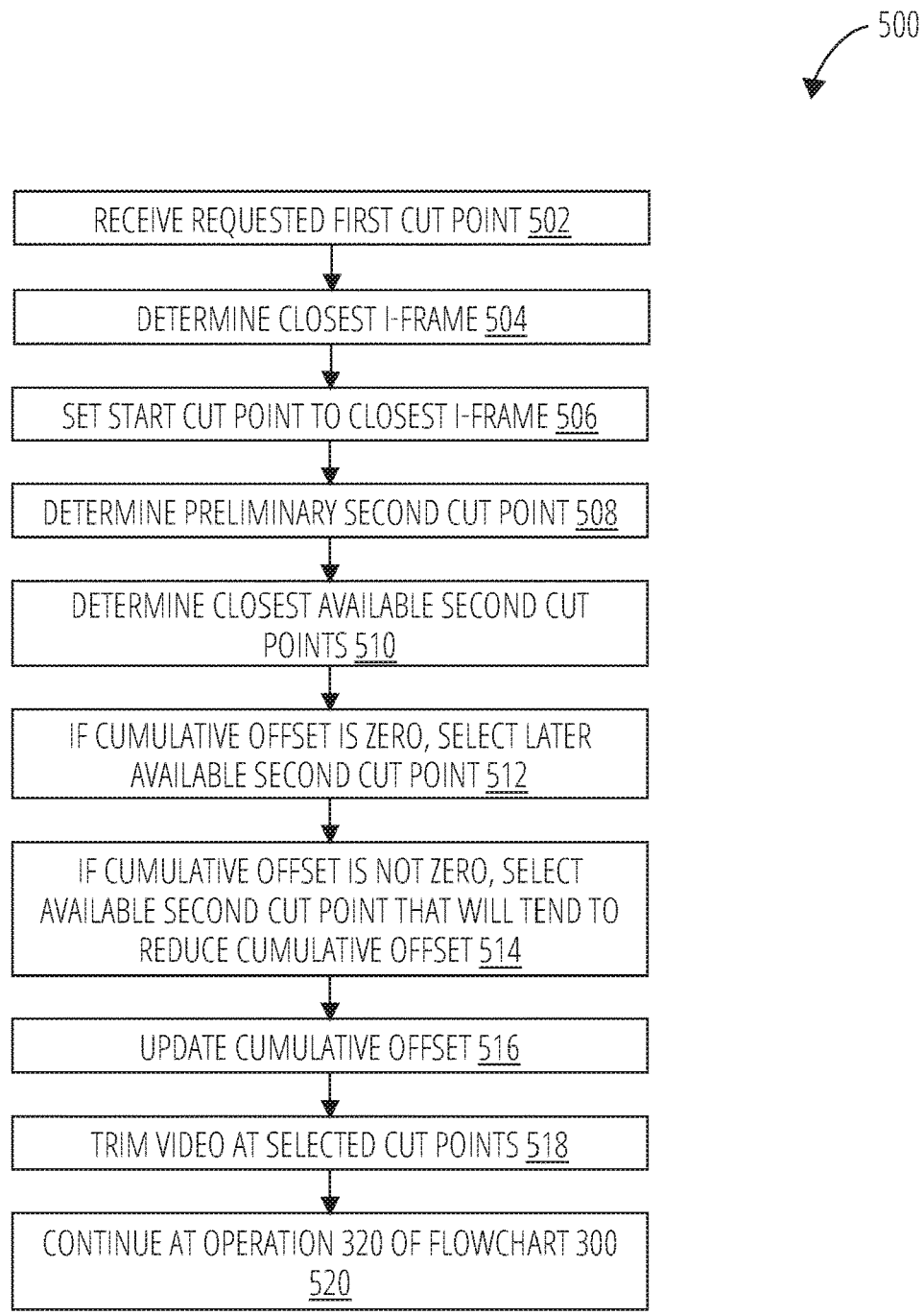
FIG. 5 is a flowchart showing video trimming operations according to some examples.

FIG. 5 is a flowchart 500 showing video trimming operations according to one example. These operations are one example of the steps performed in operation 318 of FIG. 3 and implement the techniques discussed above with reference to FIG. 4A and FIG. 4B.

The method starts at operation 502 with a first requested cut point being received or generated by the video analysis and editing system 214 based on the analysis of the video discussed above compared to its assigned slot. At operation 504, the video analysis and editing system 214 determines the closest i-frame to the requested cut point, and sets the start cut point to the location of the closest i-frame at operation 506. The preliminary location of the second cut point is then determined at operation 508 by adding the desired time of the video segment to the start cut point. The video analysis and editing system 214 then determines the closest adjacent cut points to the preliminary second cut point in operation 510.

If the current cumulative offset is zero, the later available second cut point is set as the second cut point at operation 512. If the current cumulative offset is not zero, the available second cut point that will tend to reduce the magnitude of the cumulative offset is selected in operation 514 as the actual second cut point. Examples of how this selection is done by the video analysis and editing system 214 are discussed above with reference to FIG. 4A and FIG. 4B. Note that in some cases the actual magnitude of the cumulative offset may not in fact be reduced in certain instances, depending on the method used, but the overall operation of the method will tend to reduce the cumulative offset as video segments are added to the video montage.

The cumulative offset is then updated in operation 516 by adding the difference between the time of the selected second cut point and the time of the preliminary second cut point to the current cumulative value, adjusted as necessary to take any change to the playback speed of the video segment in the video montage. The video is then trimmed at the selected cut points in operation 518. The method then returns in operation 520 to flowchart 300 at operation 320.

Figure 6:
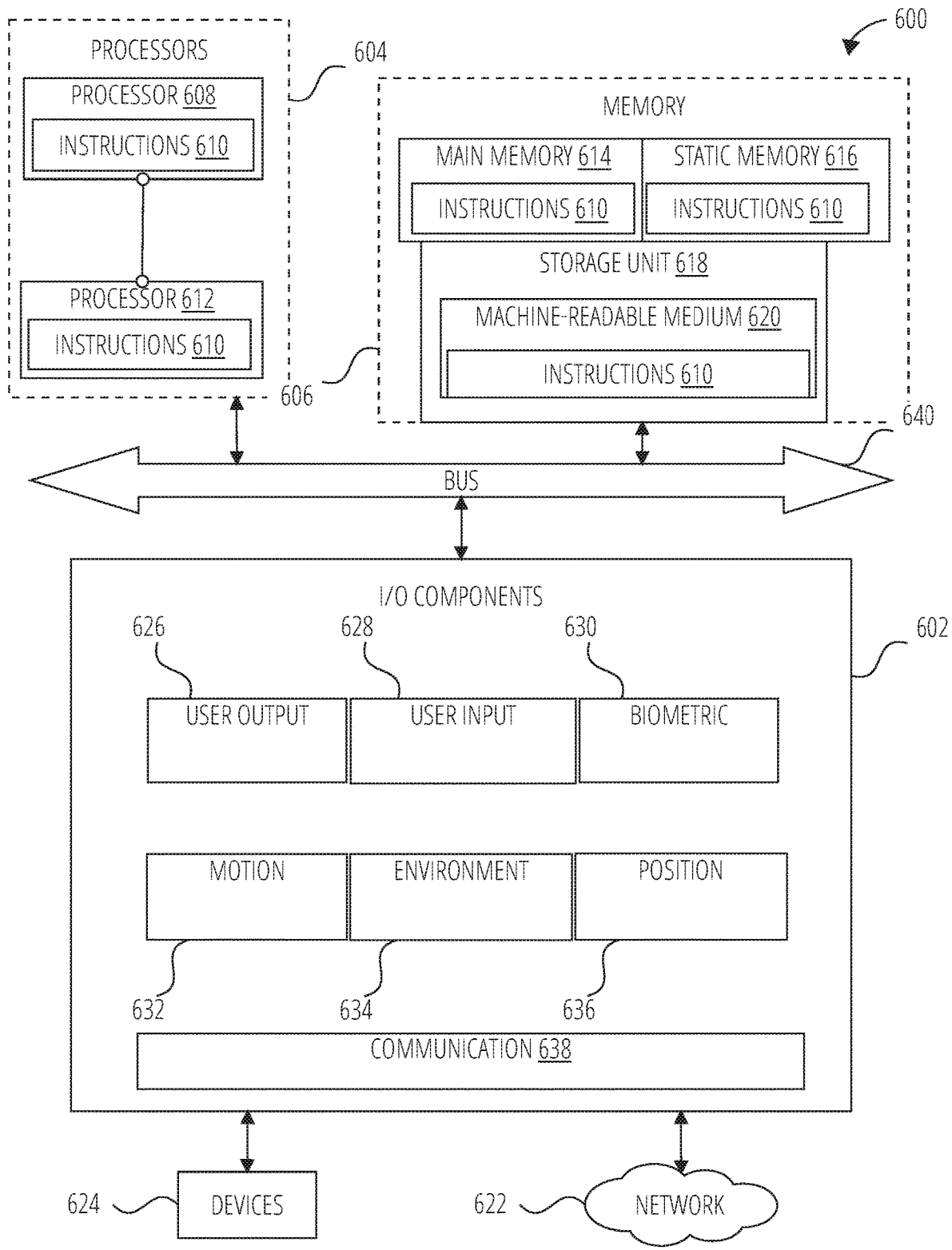
FIG. 6 is a diagrammatic representation of a machine in the form of a computer system within which a set of instructions may be executed for causing the machine to perform any one or more of the methodologies discussed herein, in accordance with some examples.

FIG. 6 is a diagrammatic representation of the machine 600 (e.g. client device 102) within which instructions 610 (e.g., software, a program, an application, an applet, an app, or other executable code) for causing the machine 600 to perform any one or more of the methodologies discussed herein may be executed. For example, the instructions 610 may cause the machine 600 to execute any one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform any one or more of the methodologies discussed herein. The machine 600, for example, may comprise the client device 102 or any one of a number of server devices forming part of the messaging server system 108. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 602, which may be configured to communicate with each other via a bus 640. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RTIC), another processor, or any suitable combination thereof) may include, for example, a processor 608 and a processor 612 that execute the instructions 610. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single-core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 606, the static memory 616, and storage unit 618 store the instructions 610 embodying any one or more of the methodologies or functions described herein. The instructions 610 may also reside, completely or partially, within the main memory 614, within the static memory 616, within machine-readable medium 620 within the storage unit 618, within at least one of the processors 604 (e.g., within the Processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

The environmental components 634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface Component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data. Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by any one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

Figure 7:
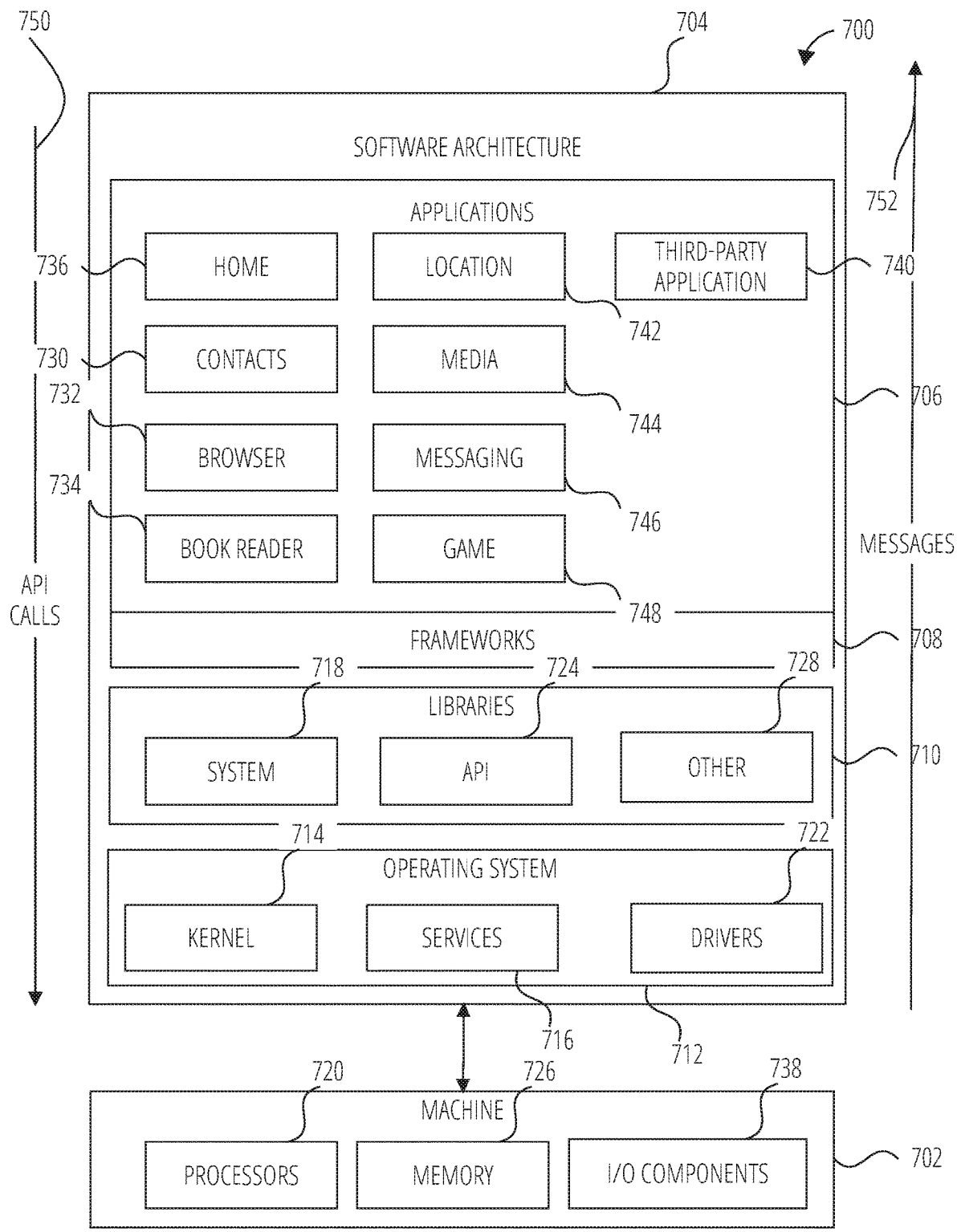
FIG. 7 is a block diagram showing a software architecture within which examples may be implemented.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionality. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746 (e.g. messaging client 104), a game application 748, and a broad assortment of other applications such as a third-party application 740. The applications 706 are programs that execute functions defined in the programs. Various programming languages can be employed to create one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 604 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm), In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media; including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, executed by one or more processors, for generation of a video file from a plurality of media files, for presentation on a device including a display, comprising:
   selecting media files from a collection of media files based on a selection criterion;
   accessing audio feature information for an audio track, the audio feature information including timing information related to audio features of the audio track;
   generating a first video segment for a first time slot from a first media file;
   generating a second video segment for a second time slot from a second media file;
   creating a video montage file by adding the second video segment to the first video segment; and
   adding the audio track to the video montage file with an audio feature location in the audio track coinciding with a start of the first video segment.

2. The method of claim 1 wherein the selection criterion comprises a time interval.

3. The method of claim 1 wherein the selection criterion comprises a number of new media files that have been captured or stored by a user of the device.

4. The method of claim 1 wherein the selection criterion comprises location information.

5. The method of claim 1, wherein the selection criterion is based on a presence of the media files in a feed posted by a user on a messaging system or social media platform.

6. The method of claim 1 wherein the first media file is a first video file, the method further comprising:
   extracting a portion of the first video file to generate the first video segment; and
   adjusting a playback speed of the portion of the first video file to generate the first video segment, the playback speed being based on a length of the first video file.

7. The method of claim 6 wherein the second media file is an image, further comprising:
   generating the second video segment by converting the second media file to a video segment having a length corresponding to the second time slot.

8. The method of claim 1, further comprising:
   determining a first initial cut point for a particular video segment to be generated from a particular video media file;
   determining a closest i-frame in the particular video media file to the first initial cut point,
   setting a first actual cut point to a location of the closest i-frame;
   determining a second actual cut point from the first actual cut point and a length of an associated time slot; and
   creating the particular video segment by trimming the particular video media file at the first actual cut point and the second actual cut point.

9. The method of claim 8 further comprising:
   determining a second preliminary cut point from the first actual cut point and a length of an associated time slot;
   based on a cumulative time offset in the video montage file being greater than zero, setting a second actual cut point to be before the second preliminary cut point;
   based on a cumulative time offset in the video montage file being less than zero, setting a second actual cut point to be after the second preliminary cut point; and
   creating the particular video segment by trimming the particular video media file at the second actual cut point.

10. A computing apparatus comprising:
    a processor; and
    a memory storing instructions that, when executed by the processor, configure the apparatus to perform operations to generate a video file from a plurality of media files, for presentation on a display, the operations comprising:
    selecting media files from a collection of media files based on a selection criterion;
    accessing audio feature information for an audio track, the audio feature information including timing information related to audio features of the audio track;
    generating a first video segment for a first time slot from a first media file;
    generating a second video segment for a second time slot from a second media file;
    creating a video montage file by adding the second video segment to the first video segment; and
    adding the audio track to the video montage file with an audio feature location in the audio track coinciding with a start of the first video segment.

11. The computing apparatus of claim 10 wherein the selection criterion comprises a time interval.

12. The computing apparatus of claim 10 wherein the selection criterion comprises a number of new media files that have been captured or stored by a user of the apparatus.

13. The computing apparatus of claim 10 wherein the selection criterion comprises location information.

14. The computing apparatus of claim 10 wherein the selection criterion is based on a presence of the media files in a feed posted by a user on a messaging system or social media platform.

15. The computing apparatus of claim 10 wherein the first media file is a first video file, wherein the instructions further configure the apparatus to perform operations comprising:
    extracting a portion of the first video file to generate the first video segment; and
    adjusting a playback speed of the portion of the first video file to generate the first video segment, the playback speed being based on a length of the first video file.

16. A non-transitory computer-readable storage medium, the computer-readable storage medium including instructions that when executed by a computer, cause the computer to generate a video file from a plurality of media files by performing operations comprising:
    selecting media files from a collection of media files based on a selection criterion;
    accessing audio feature information for an audio track, the audio feature information including timing information related to audio features of the audio track;
    generating a first video segment for a first time slot from a first media file;
    generating a second video segment for a second time slot from a second media file;
    creating a video montage file by adding the second video segment to the first video segment; and
    adding the audio track to the video montage file with an audio feature location in the audio track coinciding with a start of the first video segment.

17. The computer-readable storage medium of claim 16 wherein the selection criterion comprises a time interval.

18. The computer-readable storage medium of claim 16 wherein the selection criterion comprises location information.

19. The computer-readable storage medium of claim 16 wherein the selection criterion is based on a presence of the media files in a feed posted by a user on a messaging system or social media platform.

20. The computer-readable storage medium of claim 16; wherein the instructions further configure the computer to perform operations comprising:
- determining a first initial cut point for a particular video segment to be generated from a particular video media file;
- determining a closest i-frame in the particular video media file to the first initial cut point;
- setting a first actual cut point to a location of the closest i-frame;
- determining a second actual cut point from the first actual cut point and a length of an associated time slot; and
- creating the particular video segment by trimming the particular video media file at the first actual cut point and the second actual cut point.

* * * * *

UNITED STATES PATENT AND TRADEMARK OFFICE
CERTIFICATE OF CORRECTION

PATENT NO. : 11,721,367 B2
APPLICATION NO. : 17/546726
DATED : August 8, 2023
INVENTOR(S) : Collins et al.

Page 1 of 1

It is certified that error appears in the above-identified patent and that said Letters Patent is hereby corrected as shown below:

In the Claims

In Column 23, Line 48, in Claim 8, delete "point," and insert --point;-- therefor In Column 25, Line 5, in Claim 20, delete "claim 16;" and insert --claim 16,-- therefor Signed and Sealed this
Twenty-sixth Day of November, 2024

Katherine Kelly Vidal
*Director of the United States Patent and Trademark Office*